(12) United States Patent
Oikawa

(10) Patent No.: US 12,065,748 B2
(45) Date of Patent: Aug. 20, 2024

(54) CARBON DIOXIDE TREATMENT DEVICE, CARBON DIOXIDE TREATMENT METHOD, AND METHOD FOR PRODUCING CARBON COMPOUND

(71) Applicant: HONDA MOTOR CO., LTD., Tokyo (JP)

(72) Inventor: Hiroshi Oikawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/967,009

(22) Filed: Oct. 17, 2022

(65) Prior Publication Data

US 2023/0119993 A1 Apr. 20, 2023

(30) Foreign Application Priority Data

Oct. 18, 2021 (JP) ................................. 2021-170408

(51) Int. Cl.
  *C25B 3/03* (2021.01)
  *C25B 3/26* (2021.01)
  (Continued)

(52) U.S. Cl.
  CPC .................. *C25B 3/03* (2021.01); *C25B 3/26* (2021.01); *C25B 9/15* (2021.01); *C25B 9/17* (2021.01);
  (Continued)

(58) Field of Classification Search
  CPC .. C25B 15/08; C25B 3/03; C25B 3/26; C25B 15/023–033; C25B 3/25
  See application file for complete search history.

(56) References Cited

U.S. PATENT DOCUMENTS 11,519,089 B1 * 12/2022 Faure .................... C25B 15/023
2018/0265440 A1 9/2018 Kudo et al.
(Continued)

FOREIGN PATENT DOCUMENTS

JP    2015-513616    5/2015
JP    2018-150595    9/2018
(Continued)

OTHER PUBLICATIONS

Japanese Notice of Allowance for Japanese Patent Application No. 2021-170408 mailed Jul. 4, 2023.
(Continued)

*Primary Examiner* — Nicholas A Smith
(74) *Attorney, Agent, or Firm* — Amin, Turocy & Watson, LLP

(57) ABSTRACT

Provided is a carbon dioxide treatment device with improved energy efficiency in electrochemical reduction of carbon dioxide, a carbon dioxide treatment method, and a method for producing a carbon compound. In the carbon dioxide treatment device including a recovery device 1 configured to recover carbon dioxide, an electrochemical reaction device 2 configured to electrochemically reduce carbon dioxide to produce ethylene, a first concentration sensor 4A configured to measure a concentration of ethylene in a gas C obtained on a cathode side of the electrochemical reaction device 2, and a control device 5 configured to control an amount of carbon dioxide supplied to the electrochemical reaction device 2 and a voltage applied to the cathode and an anode based on the concentration of ethylene measured by the first concentration sensor 4A, the applied voltage is kept constant and the carbon dioxide supply amount is increased or decreased to control the carbon dioxide supply amount to be an amount at which the (Continued)

concentration of ethylene measured by the first concentration sensor 4A becomes a maximum value.

8 Claims, 4 Drawing Sheets

(51) Int. Cl.
    *C25B 9/15*            (2021.01)
    *C25B 9/17*            (2021.01)
    *C25B 9/65*            (2021.01)
    *C25B 15/023*        (2021.01)
    *C25B 15/08*         (2006.01)

(52) U.S. Cl.
    CPC .............. *C25B 9/65* (2021.01); *C25B 15/023* (2021.01); *C25B 15/08* (2013.01)

(56) References Cited

U.S. PATENT DOCUMENTS

| | | |
|---|---|---|
| 2020/0002821 A1 | 1/2020 | Ono et al. |
| 2020/0087803 A1 | 3/2020 | Kitagawa et al. |
| 2021/0002775 A1 | 1/2021 | Matsumoto et al. |
| 2021/0079542 A1 | 3/2021 | Kitagawa et al. |
| 2021/0381116 A1* | 12/2021 | Kashi ........................ C25B 9/77 |
| 2022/0119964 A1 | 4/2022 | Morimoto et al. |
| 2022/0136119 A1* | 5/2022 | Flanders ............ B01D 53/1493 |
| | | 435/71.1 |

FOREIGN PATENT DOCUMENTS

| | | |
|---|---|---|
| JP | 2019-044238 | 3/2019 |
| JP | 2019-167556 | 10/2019 |
| JP | 2020-045527 | 3/2020 |
| JP | 2020-147776 | 9/2020 |
| JP | 2021-008655 | 1/2021 |
| JP | 2021-046574 | 3/2021 |
| JP | 2021-512223 | 5/2021 |
| WO | 2013/134418 | 9/2013 |
| WO | 2018/232515 | 12/2018 |

OTHER PUBLICATIONS

Japanese Office Action for Japanese Patent Application No. 2021-170408 mailed Feb. 7, 2023.

* cited by examiner

CARBON DIOXIDE TREATMENT DEVICE, CARBON DIOXIDE TREATMENT METHOD, AND METHOD FOR PRODUCING CARBON COMPOUND

BACKGROUND OF THE INVENTION

Field of the Invention

The present disclosure relates to a carbon dioxide treatment device, a carbon dioxide treatment method, and a method for producing a carbon compound.

Description of Related Art

Technology for recovering carbon dioxide in an exhaust gas or in atmospheric air and electrochemically reducing the recovered carbon dioxide to obtain valuable resources is promising technology that has a possibility to achieve carbon neutrality. For example, technology is known (Patent Document 1) in which carbon dioxide gas is supplied from a side opposite to a catalyst layer of a gas diffusion layer to electrochemically reduce carbon dioxide gas at a cathode in which the catalyst layer is formed on a side in contact with an electrolyte of the gas diffusion layer using a carbon dioxide reduction catalyst.

PATENT DOCUMENTS

[Patent Document 1] PCT International Publication No. WO2018/232515

SUMMARY OF THE INVENTION

Economic efficiency is the greatest issue in the technology for electrochemically reducing carbon dioxide as in Patent Document 1. One of the causes of energy loss in carbon dioxide electrolysis is generation of hydrogen due to water electrolysis which is a side reaction that does not involve an intended carbon dioxide reduction reaction. For example, it is necessary for reactions with the same number of electrons to occur at a cathode and an anode. However, in a case where an anode catalyst is highly active and a cathode catalyst is low active, reactions for which there are an insufficient number of electrons by only carbon dioxide electrolysis at a cathode proceed as water electrolysis.

An object of the present disclosure is to provide a carbon dioxide treatment device with improved energy efficiency in electrochemical reduction of carbon dioxide, a carbon dioxide treatment method, and a method for producing a carbon compound.

The present disclosure has adopted the following aspects.

(1) A carbon dioxide treatment device (for example, a carbon dioxide treatment device 100 of an embodiment) according to an aspect of the present disclosure includes: a recovery device (for example, a recovery device 1 of an embodiment) configured to recover carbon dioxide; an electrochemical reaction device (for example, an electrochemical reaction device 2 of an embodiment) having a cathode (for example, a cathode 21 of an embodiment) and an anode (for example, an anode 22 of an embodiment) and configured to electrochemically reduce the carbon dioxide recovered by the recovery device to produce ethylene; a first concentration sensor (for example, a first concentration sensor 4A of an embodiment) configured to measure a concentration of ethylene in a gas obtained on the cathode side of the electrochemical reaction device; and a control device (for example, a control device 5 of an embodiment) configured to control an amount of carbon dioxide supplied to the electrochemical reaction device and a voltage applied to the cathode and the anode based on the concentration of ethylene measured by the first concentration sensor, in which the control by the control device includes (i) keeping the applied voltage constant and increasing or decreasing the carbon dioxide supply amount to control the carbon dioxide supply amount to be an amount at which the concentration of ethylene measured by the first concentration sensor becomes a maximum value.

(2) In the carbon dioxide treatment device according to one aspect of the present disclosure, the control by the control device may include (i) keeping the applied voltage constant and increasing or decreasing the carbon dioxide supply amount to control the carbon dioxide supply amount to be an amount at which the concentration of ethylene measured by the first concentration sensor becomes a maximum value and (ii) keeping the carbon dioxide supply amount constant and increasing or decreasing the applied voltage to control the applied voltage to a voltage at which the concentration of ethylene measured by the first concentration sensor becomes a maximum value, and (i) and (ii) described above may be repeated.

(3) In the carbon dioxide treatment device according to one aspect of the present disclosure, the recovery device may include an absorption unit (for example, an absorption unit 12 of an embodiment) that brings carbon dioxide gas into contact with an electrolyte consisting of a strong alkaline aqueous solution to dissolve the carbon dioxide in the electrolyte and absorb the carbon dioxide, the electrochemical reaction device may include a cathode, an anode, and a liquid flow path (for example, a liquid flow path 23a of an embodiment) which is provided between the cathode and the anode and through which the electrolyte in which the carbon dioxide is absorbed in the absorption unit flows, dissolved carbon dioxide in the electrolyte in which the carbon dioxide is absorbed may be reduced at the cathode, and a supply amount of the electrolyte in which the carbon dioxide is absorbed to the electrochemical reaction device may be controlled by the control device.

(4) In the carbon dioxide treatment device according to one aspect of the present disclosure, the recovery device may include a concentration unit (for example, a first concentration unit 11 and a second concentration unit 13) that concentrates carbon dioxide, the electrochemical reaction device may include the cathode, the anode, and a liquid flow path which is provided between the cathode and the anode and through which the electrolyte flows, the carbon dioxide gas which is supplied from the concentration unit to a side opposite to an anode side of the cathode in the electrochemical reaction device may be reduced at the cathode, and the amount of the carbon dioxide gas supplied to the electrochemical reaction device may be controlled by the control device.

(5) In the carbon dioxide treatment device according to one aspect of the present disclosure, the electrochemical reaction device may include the cathode, the anode, an anion exchange membrane (for example, an anion exchange membrane 28 of an embodiment) provided between the cathode and the anode, a cathode-side liquid flow path (for example, a cathode-side liquid flow path 29a of an embodiment) which is provided between the cathode and the anion exchange membrane and through which a cathode-side electrolyte flows, and an anode-side liquid flow path (for example, an anode-side liquid flow path 29b of an embodiment) which is provided between the anode and the anion exchange membrane and through which an anode-side electrolyte flows, the recovery device may include an absorption unit that brings carbon dioxide gas into contact with the anode-side electrolyte consisting of a strong alkaline aqueous solution to dissolve the carbon dioxide in the anode-side electrolyte and absorb the carbon dioxide, and a concentration unit that concentrates carbon dioxide, the carbon dioxide gas which is supplied from the concentration unit to a side opposite to an anode side of cathode in the electrochemical reaction device may be reduced at the cathode, and the amount of the carbon dioxide gas supplied to the electrochemical reaction device may be controlled by the control device.

(6) The carbon dioxide treatment device according to one aspect of the present disclosure may further include: a second concentration sensor (for example, a second concentration sensor 4B of an embodiment) configured to measure a concentration of hydrogen in the gas obtained on the cathode side of the electrochemical reaction device, in which control by the control device may be started when the concentration of hydrogen measured by the second concentration sensor becomes a predetermined value or more.

(7) The carbon dioxide treatment device according to an aspect of the present disclosure may further include: a homologation reaction device (for example, a homologation reaction device 6 of an embodiment) configured to increase the number of carbon atoms by multimerizing ethylene produced by reducing carbon dioxide in the electrochemical reaction device.

(8) A carbon dioxide treatment method according to one aspect of the present disclosure includes: a step (a) of electrochemically reducing carbon dioxide at a cathode using an electrochemical reaction device including the cathode and an anode to produce ethylene; and a step (b) of keeping a voltage applied to the cathode and the anode constant and increasing or decreasing an amount of carbon dioxide supplied to the electrochemical reaction device to control the carbon dioxide supply amount to an amount at which a concentration of ethylene in a gas obtained on the cathode side of the electrochemical reaction device is maximized.

(9) The carbon dioxide treatment method according to one aspect of the present disclosure may further include: a step (c) of keeping the amount of carbon dioxide supplied to the electrochemical reaction device constant and increasing or decreasing the voltage applied to the cathode and the anode to control the applied voltage to be a voltage at which the concentration of ethylene in the gas obtained on the cathode side of the electrochemical reaction device is maximized, in which the step (b) and the step (c) may be repeated to control the carbon dioxide supply amount and the applied voltage.

(10) A method for producing a carbon compound according to one aspect of the present disclosure which utilizes the carbon dioxide treatment method according to (8) or (9) described above, the method including: a step (d) of multimerizing ethylene produced by reducing carbon dioxide to obtain a carbon compound.

According to the aspects (1) to (10), it is possible to provide a carbon dioxide treatment device with improved energy efficiency in electrochemical reduction of carbon dioxide, a carbon dioxide treatment method, and a method for producing a carbon compound.

DETAILED DESCRIPTION OF THE INVENTION

Hereinafter, embodiments of the present disclosure will be described with reference to the drawings. The dimensions and the like of the drawings exemplified in the following description are merely examples, and the present disclosure is not necessarily limited thereto and can be implemented with appropriate modifications within the range that does not change the gist thereof.

[Carbon Dioxide Treatment Device]

Figure 1:
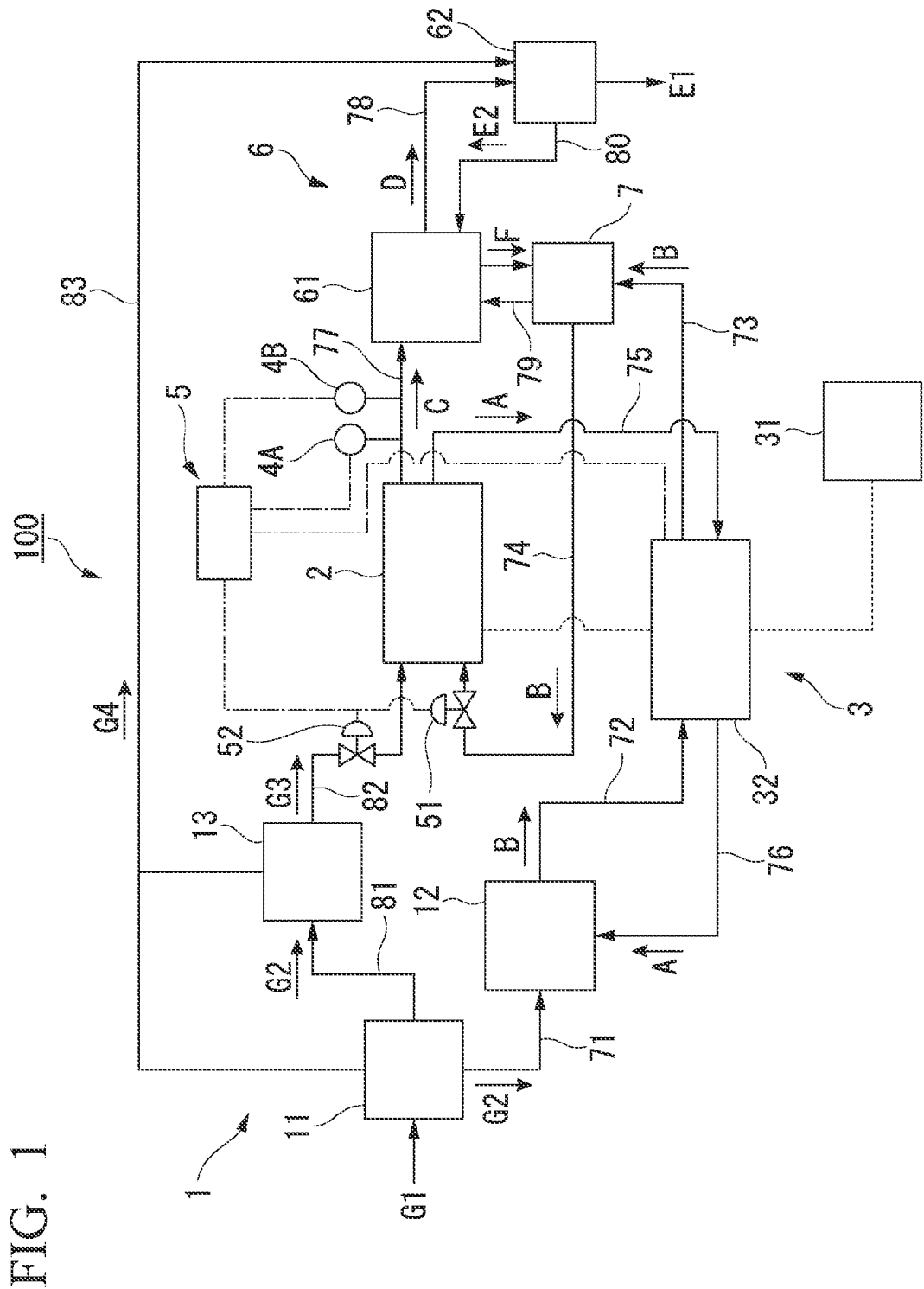
FIG. 1 is a block diagram illustrating a carbon dioxide treatment device according to an embodiment.

As shown in FIG. 1, a carbon dioxide treatment device 100 according to an aspect of the present disclosure includes a recovery device 1, an electrochemical reaction device 2, a power source storage device 3, a first concentration sensor 4A, a second concentration sensor 4B, a control device 5, a homologation reaction device 6, and a heat exchanger 7. The recovery device 1 includes a first concentration unit 11, an absorption unit 12, and a second concentration unit 13. The power source storage device 3 includes a conversion unit 31 and a storage unit 32 electrically connected to the conversion unit 31. The homologation reaction device 6 includes a reactor 61 and a gas-liquid separator 62.

In the carbon dioxide treatment device 100, the first concentration unit 11 and the absorption unit 12 are connected to each other through a gas flow path 71. The absorption unit 12 and the storage unit 32 are connected to each other through a liquid flow path 72 and a liquid flow path 76. The storage unit 32 and the heat exchanger 7 are connected to each other through a liquid flow path 73. The heat exchanger 7 and the electrochemical reaction device 2 are connected to each other through a liquid flow path 74. The electrochemical reaction device 2 and the storage unit 32 are connected to each other through a liquid flow path 75. The electrochemical reaction device 2 and the reactor 61 are connected to each other through a gas flow path 77. The reactor 61 and the gas-liquid separator 62 are connected to each other through a gas flow path 78 and a gas flow path 80. A circulation flow path 79 of a heat medium is provided between the reactor 61 and the heat exchanger 7. The first concentration unit 11 and the second concentration unit 13 are connected to each other through a gas flow path 81. The second concentration unit 13 and the electrochemical reaction device 2 are connected to each other through a gas flow path 82. The first concentration unit 11 and the second concentration unit 13 are connected to the gas-liquid separator 62 through a gas flow path 83.

These flow paths are not particularly limited, and well-known pipes can be appropriately used. A first flow rate adjustment valve 51 is provided in the liquid flow path 74, and a second flow rate adjustment valve 52 is provided within the gas flow path 82. In addition to these, gas feeding means such as a compressor, pressure reduction valves, or measuring instruments such as a pressure gauge can be appropriately installed in each of the gas flow paths. In addition, liquid feeding means such as a pump or measuring instruments such as a flowmeter can be appropriately installed in each of the liquid flow paths.

The recovery device 1 is a device configured to recover carbon dioxide.

A gas G1, such as atmospheric air or an exhaust gas, containing carbon dioxide is supplied to the first concentration unit 11. The carbon dioxide of the gas G1 is concentrated in the first concentration unit 11.

Any well-known concentration device can be employed as the first concentration unit 11 as long as it can concentrate carbon dioxide. For example, a membrane separation device in which the difference in permeation rate with respect to membranes is used, and an adsorption separation device in which chemical or physical adsorption and desorption are used can be used. Of these, chemisorption, especially adsorption using a temperature swing, is preferable from the viewpoint of exceptional separation performance.

A concentrated gas G2 obtained by concentrating carbon dioxide in the first concentration unit 11 is supplied to the absorption unit 12 and the second concentration unit 13 respectively through the gas flow path 71 and the gas flow path 81. In addition, a separation gas G4 separated from the concentrated gas G2 is sent to the gas-liquid separator 62 through the gas flow path 83.

In the absorption unit 12, the carbon dioxide gas in the concentrated gas G2 supplied from the first concentration unit 11 comes into contact with the electrolyte A and carbon dioxide is dissolved and absorbed in the electrolyte A. The technique of bringing the carbon dioxide gas into contact with the electrolyte A is not particularly limited, and examples thereof include a technique of blowing the concentrated gas G2 into the electrolyte A for bubbling.

In the absorption unit 12, the electrolyte A containing a strong alkaline aqueous solution is used as an absorption liquid for absorbing carbon dioxide. In carbon dioxide, a carbon atom is positively charged ($\delta+$) because oxygen atoms strongly attract electrons. For this reason, in a strong alkaline aqueous solution in which a large amount of hydroxide ions is present, carbon dioxide goes from a hydrated state to an equilibrium state in which a dissolution reaction to $CO_3^{2-}$ via $HCO_3^-$ is likely to proceed and there is a high $CO_3^{2-}$ abundance ratio. For this reason, since carbon dioxide is more likely to be dissolved in the strong alkaline aqueous solution compared to other gases such as nitrogen, hydrogen, and oxygen, the carbon dioxide in the concentrated gas G2 is selectively absorbed in the electrolyte A in the absorption unit 12. In this manner, the concentration of carbon dioxide can be assisted using the electrolyte A in the absorption unit 12. For this reason, it is unnecessary for the carbon dioxide to be concentrated to a high concentration in the first concentration unit 11, and the energy required for the concentration in the first concentration unit 11 can be reduced.

An electrolyte B in which the carbon dioxide is absorbed in the absorption unit 12 is sent to the electrochemical reaction device 2 through the liquid flow path 72, the storage unit 32, the liquid flow path 73, the heat exchanger 7, and the liquid flow path 74. In addition, the electrolyte A flowing out of the electrochemical reaction device 2 is sent to the absorption unit 12 through the liquid flow path 75, the storage unit 32, and the liquid flow path 76. In this manner, electrolytes circulate and are shared between the absorption unit 12, the storage unit 32, and the electrochemical reaction device 2 in the carbon dioxide treatment device 100.

Examples of strong alkaline aqueous solutions used in the electrolyte A include a potassium hydroxide aqueous solution and a sodium hydroxide aqueous solution. Of these, a potassium hydroxide aqueous solution is preferable from the viewpoints of exceptional solubility of carbon dioxide in the absorption unit 12 and promotion of reduction of carbon dioxide in the electrochemical reaction device 2.

The carbon dioxide of the concentrated gas G2 is further concentrated in the second concentration unit 13 to become a concentrated gas G3. The concentrated gas G3 is sent to the electrochemical reaction device 2 through the gas flow path 82. In addition, the separation gas G4 separated from the concentrated gas G3 is sent to the gas-liquid separator 62 through the gas flow path 83.

The second concentration unit 13 is not particularly limited. The same as those exemplified in the first concentration unit 11 can be exemplified, and chemisorption, especially temperature swing adsorption, is preferable.

Figure 2:
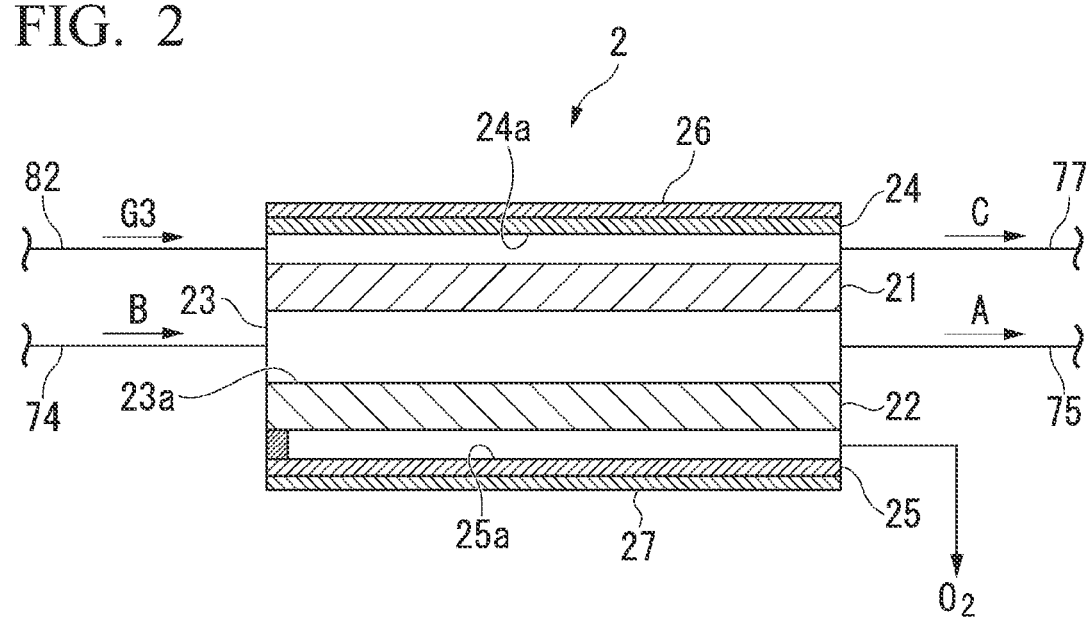
FIG. 2 is a schematic cross-sectional view illustrating an example of an electrolysis cell of an electrochemical reaction device.

The electrochemical reaction device 2 is a device configured to electrochemically reduce carbon dioxide. As shown in FIG. 2, the electrochemical reaction device 2 includes a cathode 21, an anode 22, a liquid flow path structure 23 for forming a liquid flow path 23a, a gas flow path structure 24 in which a gas flow path 24a is formed, a gas flow path structure 25 in which a gas flow path 25a is formed, a power supply body 26, and a power supply body 27.

In the electrochemical reaction device 2, the power supply body 26, the gas flow path structure 24, the cathode 21, the liquid flow path structure 23, the anode 22, the gas flow path structure 25, and the power supply body 27 are stacked in that order. A slit is formed in the liquid flow path structure 23, and a region of the slit surrounded by the cathode 21, the anode 22, and the liquid flow path structure 23 forms a liquid flow path 23a. A groove is formed on the cathode 21 side of the gas flow path structure 24, and a portion of the groove surrounded by the gas flow path structure 24 and the cathode 21 forms the gas flow path 24a. A groove is formed on the anode 22 side of the gas flow path structure 25, and a portion of the groove surrounded by the gas flow path structure 25 and the anode 22 forms the gas flow path 25a.

In this manner, in the electrochemical reaction device 2, the liquid flow path 23a is formed between the cathode 21 and the anode 22, the gas flow path 24a is formed between the cathode 21 and the power supply body 26, and the gas flow path 25a is formed between the anode 22 and the power supply body 27. The power supply body 26 and the power supply body 27 are electrically connected to the storage unit 32 of the power source storage device 3. In addition, the gas flow path structure 24 and the gas flow path structure 25 are conductors, and a voltage can be applied between the cathode 21 and the anode 22 due to electric power supplied from the storage unit 32.

The cathode 21 is an electrode that reduces carbon dioxide to produce a carbon compound and reduces water to produce hydrogen. As the cathode 21, any one may be used as long as it can electrochemically reduce carbon dioxide and allow produced gaseous carbon compounds and hydrogen to permeate through the gas flow path 24a. Examples thereof include an electrode having a cathode catalyst layer formed on the liquid flow path 23a side of a gas diffusion layer. Part of the cathode catalyst layer may penetrate into the gas diffusion layer. A porous layer that is denser than the gas diffusion layer may be placed between the gas diffusion layer and the cathode catalyst layer.

A well-known catalyst that promotes reduction of carbon dioxide can be used as a cathode catalyst forming the cathode catalyst layer. Specific examples of cathode catalysts include metals such as gold, silver, copper, platinum, palladium, nickel, cobalt, iron, manganese, titanium, cadmium, zinc, indium, gallium, lead, and tin, alloys or intermetallic compounds thereof, and metal complexes such as a ruthenium complex and a rhenium complex. Among them, copper and silver are preferable and copper is more preferable because these promote the reduction of carbon dioxide. Cathode catalysts may be used alone or in a combination of two or more thereof.

As the cathode catalyst, a supported catalyst in which metal particles are supported on carbon materials (such as carbon particles, carbon nanotubes, or graphene) may be used.

The gas diffusion layer of the cathode 21 is not particularly limited, but examples thereof include carbon paper and carbon cloth.

A method for manufacturing the cathode 21 is not particularly limited, but examples thereof include a method for applying a liquid composition containing a cathode catalyst to a surface on the liquid flow path 23a side of the gas diffusion layer and drying the applied liquid composition.

The anode 22 is an electrode that oxidizes hydroxide ions to produce oxygen. As the anode 22, any anode may be used as long as it can electrochemically oxidize hydroxide ions and allow produced oxygen to permeate through the gas flow path 25a. Examples thereof include an electrode having an anode catalyst layer formed on the liquid flow path 23a side of a gas diffusion layer.

The anode catalyst forming an anode catalyst layer is not particularly limited, and a well-known anode catalyst can be used. Specific examples thereof include metals such as platinum, palladium, and nickel, alloys or intermetallic compounds thereof, metal oxides such as manganese oxide, iridium oxide, nickel oxide, cobalt oxide, iron oxide, tin oxide, indium oxide, ruthenium oxide, lithium oxide, and lanthanum oxide, and metal complexes such as a ruthenium complex and a rhenium complex. Anode catalysts may be used alone or in a combination of two or more thereof.

Examples of the gas diffusion layer of the anode 22 include carbon paper and carbon cloth. In addition, a porous body such as a mesh material, a punched material, or a metal fiber sintered body may be used as the gas diffusion layer. Examples of materials of porous bodies include metals such as titanium, nickel, and iron, and alloys thereof (for example, SUS).

Examples of materials of the liquid flow path structure 23 include fluororesins such as polytetrafluoroethylene.

Examples of materials of the gas flow path structures 24 and 25 include metals such as titanium and SUS and carbon.

Examples of materials of the power supply bodies 26 and 27 include metals such as copper, gold, titanium, and SUS, and carbon. Copper base materials of which the surfaces are plated with gold or the like may be used for the power supply bodies 26 and 27.

Figure 3:
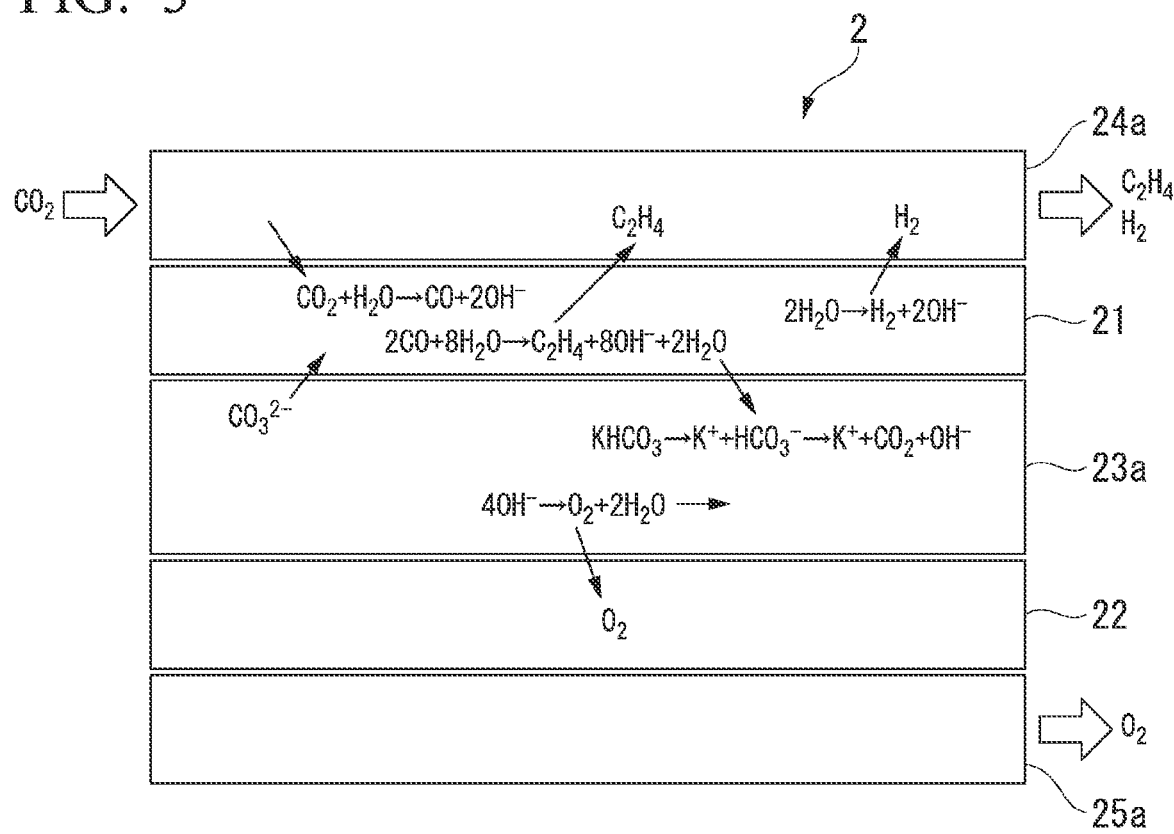
FIG. 3 is a schematic diagram illustrating an electrochemical reaction occurring in an electrolysis cell.

The electrochemical reaction device 2 is a flow cell in which the electrolyte B supplied from the absorption unit 12 flows through the liquid flow path 23a and the concentrated gas G3 supplied from the second concentration unit 13 flows through the gas flow path 24a on a side opposite to an anode 22 side of the cathode 21. When a voltage is applied to the cathode 21 and the anode 22, dissolved carbon dioxide in the electrolyte B flowing through the liquid flow path 23a and carbon dioxide gas in the concentrated gas G3 flowing through the gas flow path 24a are electrochemically reduced at the cathode 21, and hydrogen and a carbon compound containing ethylene are produced. An electrochemical reaction in the electrochemical cell of the electrochemical reaction device 2 is shown in FIG. 3.

Since carbon dioxide is dissolved in the electrolyte B at the inlet of the liquid flow path 23a, the electrolyte B is in a weak alkaline state in which the abundance ratio of $CO_3^{2-}$ is high as described above. On the other hand, the amount of dissolved carbon dioxide decreases as the reduction progresses, and the electrolyte A in a strong alkaline state is obtained at the outlet of the liquid flow path 23a.

Examples of carbon compounds produced by reducing carbon dioxide at the cathode 21 include carbon monoxide, ethylene, and ethanol. For example, as shown in FIG. 3, carbon monoxide and ethylene are produced as gaseous products by the following reaction at the cathode 21. In addition, hydrogen is also produced by the following reaction. The gaseous carbon compounds and hydrogen produced permeate through the gas diffusion layer of the cathode 21 and flow out of the gas flow path 24a.

$$CO_2 + H_2O \rightarrow CO + 2OH^-$$

$$2CO + 8H_2O \rightarrow C_2H_4 + 8OH^- + 2H_2O$$

$$2H_2O \rightarrow H_2 + 2OH^-$$

In addition, hydroxide ions produced at the cathode 21 move in the electrolyte B toward the anode 22 and are oxidized by the following reaction to produce oxygen. The produced oxygen permeates through the gas diffusion layer of the anode 22 and is discharged from the gas flow path 25a.

$$4OH^- \rightarrow O_2 + 2H_2O$$

In this manner, in the carbon dioxide treatment device 100, the electrolyte used in the electrochemical reaction device 2 is shared as an absorption liquid of the absorption unit 12, and carbon dioxide dissolved in the electrolyte B is supplied to the electrochemical reaction device 2 to be electrochemically reduced. Accordingly, the energy required for desorption of carbon dioxide can be reduced compared to a case where, for example, carbon dioxide is adsorbed on an adsorbent and desorbed through heating for reduction, whereby the energy efficiency can increase and loss of carbon dioxide can also be reduced.

The power source storage device 3 is a device configured to supply electric power to the electrochemical reaction device 2.

Renewable energy is converted into electrical energy in the conversion unit 31. The conversion unit 31 is not particularly limited, and examples thereof include a wind power generator, a solar power generator, and a geothermal power generator. The number of conversion units 31 included in the power source storage device 3 may be one or two or more.

The electrical energy converted in the conversion unit 31 is stored in the storage unit 32. By storing the converted electrical energy in the storage unit 32, electric power can be stably supplied to the electrochemical reaction device 2 even during a period of time when the conversion unit is not generating power. In addition, in a case where renewable energy is used, voltage fluctuations generally tend to be large. However, once renewable energy is stored in the storage unit 32, electric power can be supplied to the electrochemical reaction device 2 at a stable voltage.

The storage unit 32 in this example is a nickel-hydride battery. Regarding the storage unit 32, any unit may be used as long as charging and discharging can be performed. For example, a lithium ion secondary battery or the like may be used.

Figure 4A:
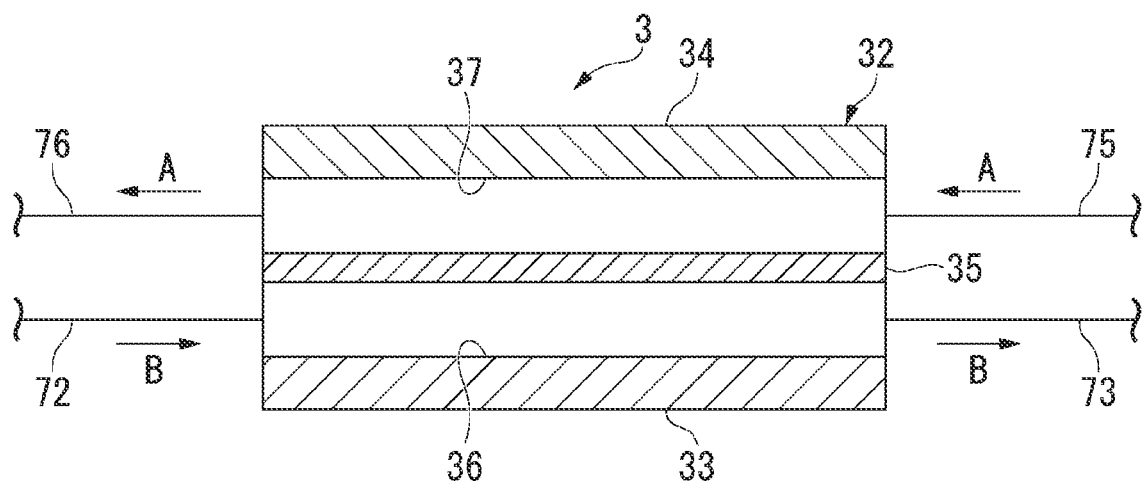
FIG. 4A is a schematic cross-sectional view illustrating a nickel-hydride battery during discharge which is an example of a storage unit.

The storage unit 32 is a nickel-hydride battery including a positive electrode 33, a negative electrode 34, a separator 35 provided between the positive electrode 33 and the negative electrode 34, a positive electrode side flow path 36 formed between the positive electrode 33 and the separator 35, and a negative electrode side flow path 37 formed between the negative electrode 34 and the separator 35 as shown in FIG. 4(A). The positive electrode side flow path 36 and the negative electrode side flow path 37 can be formed using the same liquid flow path structure as the liquid flow path 23a of the electrochemical reaction device 2, for example.

Examples of the positive electrode 33 include one obtained by applying a positive electrode active material to the positive electrode side flow path 36 of a positive electrode current collector.

The positive electrode current collector is not particularly limited, and examples thereof include nickel foil and nickel-plated metal foil.

The positive electrode active material is not particularly limited, and examples thereof include nickel hydroxide and nickel oxyhydroxide.

Examples of the negative electrode 34 include one obtained by applying a negative electrode active material to the negative electrode side flow path 37 of a negative electrode current collector.

The negative electrode current collector is not particularly limited, and examples thereof include a nickel mesh.

The negative electrode active material is not particularly limited, and examples thereof include a well-known hydrogen storage alloy.

The separator 35 is not particularly limited, and examples thereof include an ion-exchange membrane.

The nickel-hydride battery which is the storage unit 32 is a flow cell in which electrolytes flow through the positive electrode side flow path 36 of the separator 35 on the positive electrode 33 side and the negative electrode side flow path 37 of the separator 35 on the negative electrode 34 side. In the carbon dioxide treatment device 100, the electrolyte B supplied from the absorption unit 12 through the liquid flow path 72 and the electrolyte A supplied from the electrochemical reaction device 2 through the liquid flow path 75 flow through the positive electrode side flow path 36 and the negative electrode side flow path 37, respectively. In addition, the connection of the liquid flow paths 72 and 73 to the storage unit 32 can be switched between a state of being connected to the positive electrode side flow path 36 and a state of being connected to the negative electrode side flow path 37. Similarly, the connection of the liquid flow paths 75 and 76 to the storage unit 32 can be switched between a state of being connected to the positive electrode side flow path 36 and a state of being connected to the negative electrode side flow path 37.

Hydroxide ions are generated from water molecules in the positive electrode when the nickel-hydride battery is discharged, and the hydroxide ions transferred to the negative electrode receive hydrogen ions from the hydrogen storage alloy to generate water molecules. For this reason, from the viewpoint of discharge efficiency, it is advantageous for the electrolyte flowing through the positive electrode side flow path 36 to be in a weak alkaline state and it is advantageous for the electrolyte flowing through the negative electrode side flow path 37 to be in a strong alkaline state. For this reason, during discharge, as shown in FIG. 4(A), it is preferable that the liquid flow paths 72 and 73 be connected to the positive electrode side flow path 36 and the liquid flow paths 75 and 76 be connected to the negative electrode side flow path 37 to make the (weak alkaline) electrolyte B supplied from the absorption unit 12 flow through the positive electrode side flow path 36 and to make the (strong alkaline) electrolyte A supplied from the electrochemical reaction device 2 flow through the negative electrode side flow path 37. That is, it is preferable that the electrolytes circulate in order of the absorption unit 12, the positive electrode side flow path 36 of the storage unit 32, the electrochemical reaction device 2, the negative electrode side flow path 37 of the storage unit 32, and the absorption unit 12 during discharge.

Figure 4B:
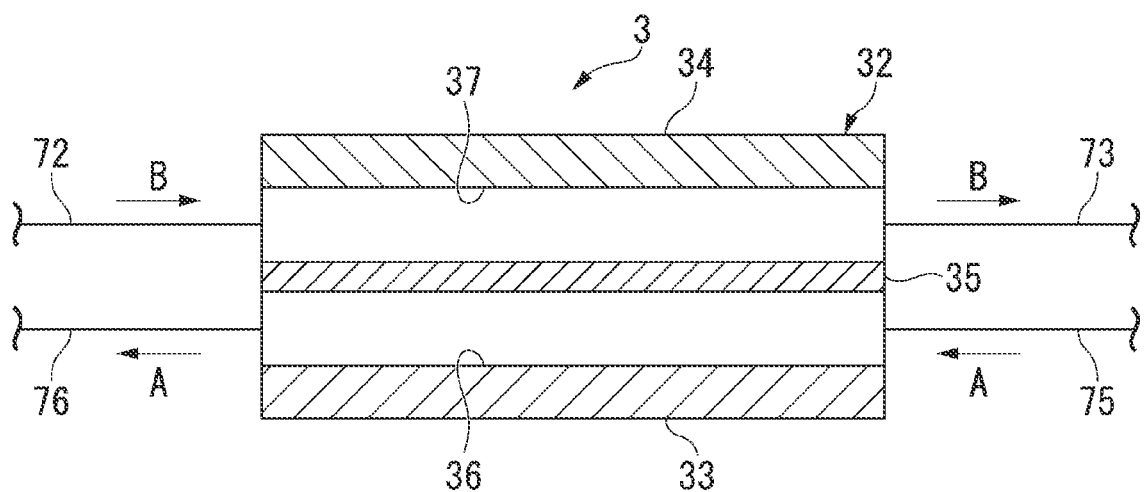
FIG. 4B is a schematic cross-sectional view illustrating a nickel-hydride battery during charge which is an example of a storage unit.

In addition, when the nickel-hydride battery is charged, water molecules are generated from hydroxide ions in the positive electrode and dissolved in hydrogen atoms and hydroxide ions in the negative electrode, and the hydrogen atoms are stored in the hydrogen storage alloy. For this reason, from the viewpoint of charge efficiency, it is advantageous for the electrolyte flowing through the positive electrode side flow path 36 to be in a strong alkaline state and it is advantageous for the electrolyte flowing through the negative electrode side flow path 37 to be in a strong alkaline state. For this reason, during charge, as shown in FIG. 4(B), it is preferable that the liquid flow paths 72 and 73 be connected to the negative electrode side flow path 37 and the liquid flow paths 75 and 76 be connected to the positive electrode side flow path 36 to make the (weak alkaline) electrolyte B supplied from the absorption unit 12 flow through the negative electrode side flow path 37 and to make the (strong alkaline) electrolyte A supplied from the electrochemical reaction device 2 flow through the positive electrode side flow path 36. That is, it is preferable that the electrolytes circulate in order of the absorption unit 12, the negative electrode side flow path 37 of the storage unit 32, the electrochemical reaction device 2, the positive electrode side flow path 36 of the storage unit 32, and the absorption unit 12 during charge.

In general, when a secondary battery is incorporated in a device, the overall energy efficiency tends to decrease by the amount of charge-discharge efficiency. However, by appropriately replacing the electrolytes flowing through the positive electrode side flow path 36 and the negative electrode side flow path 37 of the storage unit 32 using pH gradients of the electrolyte A and the electrolyte B before and after the electrochemical reaction device 2 as described above, it is possible to improve the charge-discharge efficiency of "concentration overvoltage" of an electrode reaction represented by the Nernst equation.

The first concentration sensor 4A is a sensor configured to measure a concentration of ethylene in a gas C obtained on the cathode 21 side of the electrochemical reaction device 2. The first concentration sensor 4A is not particularly limited as long as the concentration of ethylene can be measured, and a well-known concentration sensor can be employed.

The second concentration sensor 4B is a sensor configured to measure a concentration of hydrogen in the gas C obtained on the cathode 21 side of the electrochemical reaction device 2. The second concentration sensor 4B is not particularly limited as long as the concentration of hydrogen can be measured, and a well-known concentration sensor can be employed.

Although the first concentration sensor 4A and the second concentration sensor 4B are provided in the gas flow path 77 in the example shown in FIG. 1, the present disclosure is not limited to this aspect.

In the cathode 21 of the electrochemical reaction device 2, hydrogen is generated due to water electrolysis which is a side reaction that does not involve an intended carbon dioxide reduction reaction as described above, which is one of the causes of energy loss in carbon dioxide electrolysis.

The balance of catalytic activities between an anode and a cathode is very important to suppress generation of $H_2$ at the cathode in embodiments. For example, in a case where an anode catalyst is highly active and a cathode catalyst is low active, $O_2$ is actively generated at the anode, whereas the $CO_2$ electrolysis reaction rate at the cathode becomes insufficient and $H_2$ is produced by water electrolysis which is a side reaction. Energy loss can be reduced if the reaction rates at both electrodes during the operation of the carbon dioxide treatment device can be appropriately managed. However, the optimal solution for the management changes depending on the balance or the level of deterioration of catalysts at both electrodes. For this reason, it would be useful if there is means to flexibly manage the reaction rates at both electrodes. In the embodiments, the control device 5 that can control the amount of carbon dioxide supplied to the electrochemical reaction device 2 is used as the means to flexibly manage the reaction rates.

The control device 5 is a device configured to control an amount of carbon dioxide supplied to the electrochemical reaction device 2 and a voltage applied to the cathode 21 and the anode 22 based on the concentration of ethylene measured by the first concentration sensor 4A.

The control device 5 in the example shown in FIG. 1 controls the amount of the electrolyte B supplied to the electrochemical reaction device 2 by adjusting the first flow rate adjustment valve 51 and controls the amount of the concentrated gas G3 supplied to the electrochemical reaction device 2 by adjusting the second flow rate adjustment valve 52. That is, the control device 5 in this example can control the amount of carbon dioxide supplied to the electrochemical reaction device 2 by controlling at least one of the supply amount of the electrolyte B in which carbon dioxide is dissolved and the supply amount of the concentrated gas G3 containing carbon dioxide gas. In addition, the control device 5 in the example shown in FIG. 1 can control the voltage applied between the cathode 21 and the anode 22 by controlling the amount of electric power supplied to the electrochemical reaction device 2 of the power source storage device 3.

The control device 5 is not limited to this aspect. For example, the control device 5 may be an aspect of controlling only one of the supply amount of the electrolyte B in which carbon dioxide is dissolved and the supply amount of the concentrated gas G3 containing carbon dioxide gas.

The control by the control device 5 includes (i) keeping the voltage applied to the cathode 21 and the anode 22 constant and increasing or decreasing the amount of carbon dioxide supplied to the electrochemical reaction device 2 to control the carbon dioxide supply amount to be an amount at which the concentration of ethylene measured by the first concentration sensor 4A becomes a maximum value. Accordingly, the reaction rates at both electrodes can be flexibly managed according to the catalyst deterioration state. Therefore, the energy loss can be reduced and ethylene can be produced with high efficiency.

The control (i) will be described in more detail. First, the voltage applied to the cathode 21 and the anode 22 is kept constant, and the concentration of ethylene in the gas C obtained on the cathode 21 side of the electrochemical reaction device 2 is measured by the first concentration sensor 4A while increasing or decreasing the amount of carbon dioxide supplied to the electrochemical reaction device 2. Then, the amount of the carbon dioxide supplied when the concentration of ethylene measured during the increase or decrease of carbon dioxide is maximized is detected. Then the amount of carbon dioxide supplied to the electrochemical reaction device 2 is set to the detected amount.

The control by the control device 5 further includes, in addition to the control (i), (ii) keeping the amount of carbon dioxide supplied to the electrochemical reaction device 2 constant and increasing or decreasing the voltage applied to the cathode 21 and the anode 22 to control the applied voltage to be a voltage at which the concentration of ethylene measured by the first concentration sensor 4A becomes a maximum value, and the control (i) and the control (ii) are preferably repeated. Accordingly, the reaction rates at both electrodes can be more flexibly managed according to the catalyst deterioration state. Therefore, the energy loss can be further reduced and the amount of ethylene produced can be maximized.

The control (ii) will be described in more detail. First, the amount of carbon dioxide supplied to the electrochemical reaction device 2 is kept constant, and the concentration of ethylene in the gas C obtained on the cathode 21 side of the electrochemical reaction device 2 is measured by the first concentration sensor 4A while increasing or decreasing the voltage applied to the cathode 21 and the anode 22. Then, the amount of the carbon dioxide supplied when the concentration of ethylene measured during the increase or decrease of the applied voltage is maximized is detected. Then, the voltage applied to the cathode 21 and the anode 22 is set to the value.

The time for stopping the repetition of the control (i) and the control (ii) by the control device 5 is not particularly limited. For example, the concentration of hydrogen as a reference for stopping can be determined in advance, and when the concentration of hydrogen measured by the second concentration sensor 4B is less than a predetermined value, the repetition of the control (i) and the control (ii) can be set to stop. However, the present disclosure is not limited thereto.

The change rate of a carbon dioxide supply amount $R_1$ which is set such that the concentration of ethylene becomes a maximum value by a subsequent control (i) to a carbon dioxide supply amount $R_0$ which is set such that the concentration of ethylene becomes a maximum value by the previous control (i) is set to P (where $P=(R_1-R_0)/R_0 \times 100$). In addition, the change rate of an applied voltage $V_1$ which is set such that the concentration of ethylene becomes a maximum value by a subsequent control (ii) to an applied voltage $V_0$ which is set such that the concentration of ethylene becomes a maximum value by the previous control (ii) is set to Q (where $Q=(V_1-V_0)/V_0 \times 100$). For example, the repetition of the control (i) and the control (ii) can be set to stop when both the change rate P and the change rate Q became 0.5% or less, more preferably 1% or less.

The control by the control device 5 can be preferably set to start when the concentration of hydrogen, measured by the second concentration sensor 4B, in the gas C obtained on the cathode 21 side of the electrochemical reaction device 2 became a predetermined value or more. Accordingly, the reaction rates at both electrodes are likely to be flexibly managed according to the catalyst deterioration state.

The homologation reaction device 6 is a device configured to increase the number of carbon atoms by multimerizing ethylene produced by reducing carbon dioxide in the electrochemical reaction device 2.

The gas C containing ethylene obtained on the cathode 21 side of the electrochemical reaction device 2 is sent to the reactor 61 through the gas flow path 77. In the reactor 61, the ethylene multimerization reaction is performed in the presence of an olefin multimerization catalyst. Accordingly, carbon-increased olefins such as 1-butene, 1-hexene, and 1-octene can be produced, for example.

The olefin multimerization catalyst is not particularly limited, and a well-known catalyst used for a multimerization reaction can be used. Examples thereof include a transition metal complex compound and a solid acid catalyst using silica-alumina or a zeolite as a carrier.

In the homologation reaction device 6 in this example, a produced gas D after the multimerization reaction flowing out of the reactor 61 is sent to the gas-liquid separator 62 through the gas flow path 78. An olefin having 6 or more carbon atoms is a liquid at normal temperature. For this reason, in a case where, for example, olefins having 6 or more carbon atoms are used as target carbon compounds, by setting the temperature of the gas-liquid separator 62 to about 30° C., it is possible to easily perform gas-liquid separation into olefins having 6 or more carbon atoms (olefin liquid E1) and olefins having less than 6 carbon atoms (olefin gas E2). In addition, by increasing the temperature of the gas-liquid separator 62, the number of carbon atoms of the obtained olefin liquid E1 can be increased.

If the gas G1 supplied to the first concentration unit 11 of the recovery device 1 is atmospheric air, the separation gas G4 sent from the first concentration unit 11 and the second concentration unit 13 through the gas flow path 83 may be used for cooling the produced gas D in the gas-liquid separator 62. For example, the separation gas G4 is passed through a cooling tube using the gas-liquid separator 62 including the cooling tube, and the produced gas D is passed outside the cooling tube and is aggregated on the surface of the cooling tube to obtain the olefin liquid E1. In addition, since the olefin gas E2 separated in the gas-liquid separator 62 contains unreacted components such as ethylene or olefins having a smaller number of carbon atoms than that of a target olefin, it can be returned to the reactor 61 through the gas flow path 80 to be reused for a multimerization reaction.

The ethylene multimerization reaction in the reactor 61 is an exothermic reaction in which a supplied material has a higher enthalpy than a produced material and the reaction enthalpy is negative. In the carbon dioxide treatment device 100, a heat medium F is heated using reaction heat generated in the reactor 61 of the homologation reaction device 6 and is circulated to the heat exchanger 7 through the circulation flow path 79, and heat is exchanged between the heat medium F and the electrolyte B in the heat exchanger 7. Accordingly, the electrolyte B supplied to the electrochemical reaction device 2 is heated. In the electrolyte B in which a strong alkaline aqueous solution is used, dissolved carbon dioxide is less likely to be separated as a gas even if the temperature is raised, and the redox reaction rate in the electrochemical reaction device 2 is improved by raising the temperature of the electrolyte B.

The homologation reaction device 6 may further include a reactor that performs a hydrogenation reaction of olefins obtained by multimerizing ethylene using hydrogen produced in the electrochemical reaction device 2 or a reactor that performs an isomerization reaction of olefins or paraffins.

[Carbon Dioxide Treatment Method]

A carbon dioxide treatment method according to an aspect of the present disclosure is a method including a step (a) and a step (b) below. The carbon dioxide treatment method of the present disclosure can be used in a method for producing a carbon compound. That is, by using the carbon dioxide treatment method of the present disclosure, it is possible to produce a carbon compound obtained by reducing carbon dioxide or another carbon compound using a carbon compound obtained by reducing carbon dioxide as a raw material.

Step (a): Carbon dioxide is electrochemically reduced at a cathode using an electrochemical reaction device including the cathode and an anode to produce ethylene.

Step (b): A voltage applied to the cathode and the anode is kept constant and the amount of carbon dioxide supplied to the electrochemical reaction device is increased or decreased to control the carbon dioxide supply amount to be an amount at which a concentration of ethylene in a gas obtained on the cathode side of the electrochemical reaction device becomes a maximum value.

The carbon dioxide treatment method according to an aspect of the present disclosure is preferably a method further including a step (c) below in addition to the step (a) and the step (b), in which the step (b) and the step (c) are repeated to control both the carbon dioxide supply amount and the applied voltage.

Step (c): The amount of carbon dioxide supplied to the electrochemical reaction device is kept constant and the voltage applied to the cathode and the anode are increased or decreased to control the applied voltage to be a voltage at which the concentration of ethylene in the gas obtained on the cathode side of the electrochemical reaction device becomes a maximum value.

In addition, in a case where a carbon dioxide treatment device including a homologation reaction device is used like the carbon dioxide treatment device 100, the carbon dioxide treatment method further includes a step (d) below.

Step (d): Ethylene produced by reducing dissolved carbon dioxide is multimerized.

Hereinafter, a case of using the carbon dioxide treatment device 100 described above will be described as an example of the carbon dioxide treatment method.

In the carbon dioxide treatment method using the carbon dioxide treatment device 100, an exhaust gas, atmospheric air, or the like is supplied as the gas G1 to the first concentration unit 11, and carbon dioxide is concentrated to obtain a concentrated gas G2. As described above, since absorption of carbon dioxide in the electrolyte A in the absorption unit 12 assists the concentration, it is unnecessary to concentrate carbon dioxide in the first concentration unit 11 to a high concentration. The concentration of carbon dioxide in the concentrated gas G2 can be appropriately set, for example, to 25 to 85 volume %.

Part of the concentrated gas G2 from the first concentration unit 11 is supplied to the absorption unit 12 to bring the concentrated gas G2 into contact with the electrolyte A, and carbon dioxide in the concentrated gas G2 is dissolved and absorbed in the electrolyte A. The electrolyte B in which the carbon dioxide is dissolved is in a weak alkaline state. In addition, the electrolyte B is supplied from the absorption unit 12 to the heat exchanger 7 through the storage unit 32, and the electrolyte B heated by heat exchange with the heat medium F is supplied to the electrochemical reaction device 2. The temperature of the electrolyte B supplied to the electrochemical reaction device 2 can be appropriately set, for example, to 65° C. to 105° C.

In addition, the remainder of the concentrated gas G2 obtained in the first concentration unit 11 is supplied to the second concentration unit 13, and carbon dioxide is further concentrated to obtain a concentrated gas G3. The concentration of carbon dioxide in the concentrated gas G3 can be appropriately set, for example, to 80 to 100 volume %.

In the step (a), the electrolyte B is allowed to flow through the liquid flow path 23a of the electrochemical reaction device 2 to allow the concentrated gas G3 to flow through the gas flow path 24a. In addition, electric power is supplied from the power source storage device 3 to the electrochemical reaction device 2, and a voltage is applied between the cathode 21 and the anode 22. Then, dissolved carbon dioxide in the electrolyte B and carbon dioxide gas in the concentrated gas G3 are electrochemically reduced at the cathode 21 to produce a carbon compound. At this time, hydroxide ions in the electrolyte B are oxidized at the anode 22 to generate oxygen. The amount of dissolved carbon dioxide in the electrolyte B decreases as the reduction progresses, and the electrolyte A in a strong alkaline state flows out of the outlet of the liquid flow path 23a. The gas C containing ethylene produced by the reduction permeates the gas diffusion layer of the cathode 21, flows out of the electrochemical reaction device 2 through the gas flow path 24a, and is sent to the homologation reaction device 6.

In the step (b), the voltage applied to the cathode 21 and the anode 22 is kept constant by the control device 5 at an arbitrary time during a carbon dioxide treatment and the amount of carbon dioxide supplied to the electrochemical reaction device 2 is increased or decreased to control the carbon dioxide supply amount to be an amount at which a concentration of ethylene in the gas C becomes a maximum value.

In another example, in the step (c), the amount of carbon dioxide supplied to the electrochemical reaction device 2 is kept constant by the control device 5 and the voltage applied to the cathode 21 and the anode 22 is increased or decreased to control the applied voltage to be a voltage at which the concentration of ethylene in the gas C becomes a maximum value. These steps (b) and (c) are repeated to optimize the amount of carbon dioxide supplied to the electrochemical reaction device 2 and the voltage applied to the cathode 21 and the anode 22. In a case where the step (b) and the step (c) are repeated alternately, the order thereof is not particularly limited. The steps may be performed from the step (b) or the step (c).

The time for increasing or decreasing the carbon dioxide supply amount in the step (b) can be appropriately set and can be set to, for example, 1 minute to 10 minutes.

The increase/decrease range of the carbon dioxide supply amount in the step (b) can be appropriately set and can be set to, for example, 10 L/minute (per square meter of electrode area) to 200 L/minute (per square meter of electrode area).

The time for increasing or decreasing the applied voltage in the step (c) can be appropriately set and can be set to, for example, 1 minute to 10 minutes.

The increase/decrease range of the applied voltage in the step (c) can be appropriately set and can be set to, for example, 1.5 V (per single layer) to 3.0 V (per single layer).

In the step (d), the gas C containing ethylene produced by reducing carbon dioxide is sent to the reactor 61 and brought into contact with an olefin multimerization catalyst in a gas phase in the reactor 61 to multimerize ethylene. Accordingly, olefins obtained by multimerizing ethylene are obtained. For example, in a case where olefins having 6 or more carbon atoms are used as target carbon compounds, the produced gas D coming out of the reactor 61 is sent to the gas-liquid separator 62 and cooled to about 30° C. Then, the target olefins (for example, 1-hexene) having 6 or more carbon atoms are liquefied and olefins having less than 6 carbon atoms remain as gases. Therefore, the olefins can be easily separated into an olefin liquid E1 (target carbon compound) and olefin gas E2. The number of carbon atoms of the olefin liquid E1 and the olefin gas E2 to be subjected to gas-liquid separation can be adjusted by the temperature during the gas-liquid separation.

The olefin gas E2 after the gas-liquid separation can be returned to the reactor 61 to be reused for a multimerization reaction. In this manner, in a case where an olefin having a smaller number of carbon atoms than that of a target olefin is circulated between the reactor 61 and the gas-liquid separator 62, it is preferable that the contact time between the raw material gas (mixed gas of the olefin gas E2 and the gas C containing ethylene) and the catalyst be adjusted in the reactor 61 to control the conditions so that each molecule causes an average of one multimerization reaction. Accordingly, the number of carbon atoms in the olefins produced in the reactor 61 is suppressed from being unintentionally increased. Therefore, the olefin (olefin liquid E1) having a target number of carbon atoms can be selectively separated in the gas-liquid separator 62.

According to such a method, it is possible to efficiently obtain valuables from a renewable carbon source with high selectivity. For this reason, such a method does not require a large refining facility such as a distillation tower required in petrochemistry in the related art in which a Fischer-Tropsch (FT) synthesis method or an MTG method is used, and is therefore economically advantageous overall.

The reaction temperature of the multimerization reaction is preferably 200° C. to 350° C.

The reaction time of the multimerization reaction, that is, the contact time W/F between a raw material gas and an olefin multimerization catalyst is preferably 10 to 250 g·min/mol from the viewpoint of suppressing an excessive multimerization reaction to improve the selectivity of target carbon compounds.

Olefins having a smaller number of carbon atoms than target olefins may be circulated between the reactor 61 and the gas-liquid separator 62 to improve the selectivity of carbon compound produced by adjusting the contact time between a raw material gas and a catalyst.

Furthermore, olefins obtained by multimerizing ethylene may be hydrogenated to obtain paraffins or may be further isomerized.

A well-known method can be employed as the hydrogenation reaction of olefins. For example, a hydrogenation reaction method using a solid acid catalyst such as silica-alumina or zeolites can be exemplified.

A well-known method can be employed as the isomerization reaction. For example, an isomerization reaction method using a solid acid catalyst such as silica-alumina or zeolites can be exemplified.

As described above, in one aspect of the present disclosure, since the amount of carbon dioxide supplied to an electrochemical reaction device is controlled based on the concentration of ethylene in a gas obtained on a cathode side, the reaction rate at both electrodes can be flexibly managed according to the catalyst deterioration state. For this reason, the energy loss can be reduced, and ethylene can be produced with high efficiency.

The present disclosure is not limited to the above-described aspect.

For example, a carbon dioxide treatment device which includes no absorption unit in a recovery device and in which carbon dioxide supplied from the recovery device to an electrochemical reaction device is only carbon dioxide gas from a second concentration unit may be used. In addition, a carbon dioxide treatment device which includes no second concentration unit in a recovery device and in which carbon dioxide supplied from the recovery device to an electrochemical reaction device is only dissolved carbon dioxide in an electrolyte from an absorption unit may be used.

Figure 5:
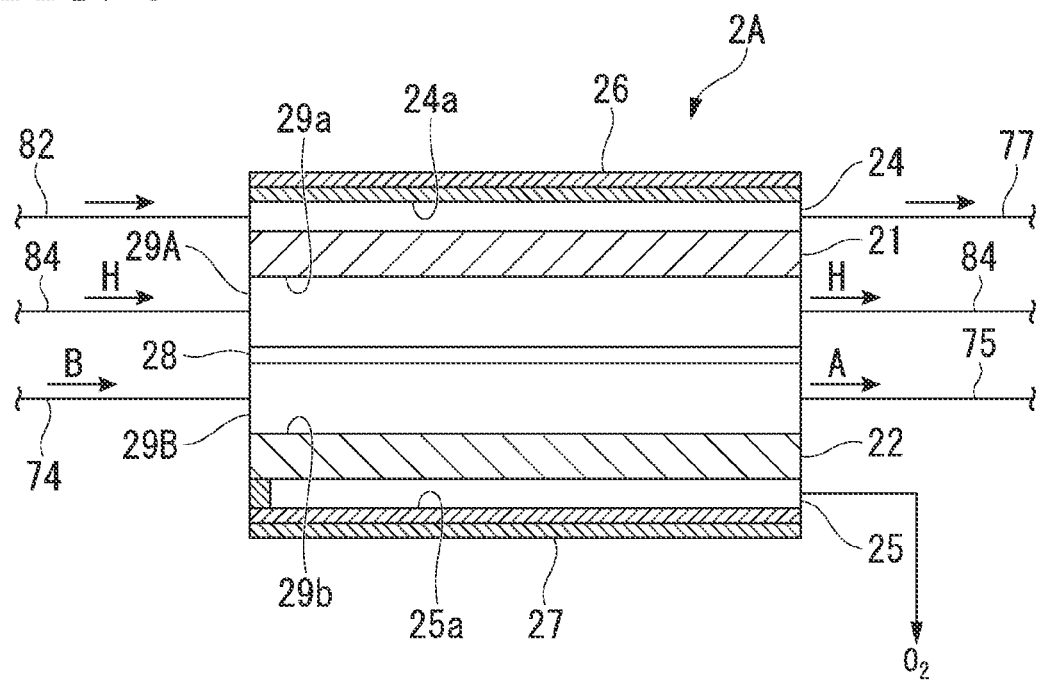
FIG. 5 is a schematic cross-sectional view illustrating another example of an electrolysis cell of an electrochemical reaction device.

A carbon dioxide treatment device including an electrochemical reaction device 2A shown in FIG. 5 instead of the electrochemical reaction device 2 in the carbon dioxide treatment device 100 may be used. The same parts as those in FIG. 2 are given the same reference numerals in FIG. 5, and the description thereof will not be repeated.

In the electrochemical reaction device 2A, a liquid flow path structure 29A, an anion exchange membrane 28, and a liquid flow path structure 29B are provided between the cathode 21 and the anode 22 in this order from the cathode 21 side. Accordingly, a cathode-side liquid flow path 29a through which a cathode-side electrolyte H flows is formed between the cathode 21 and the anion exchange membrane 28, and an anode-side liquid flow path 29b through which an anode-side electrolyte (electrolyte B) flows is formed between the anode 22 and the anion exchange membrane 28.

In the electrochemical reaction device 2A, the cathode-side electrolyte H discharged from an outlet of the cathode-side liquid flow path 29a is returned to an inlet of the cathode-side liquid flow path 29a through a liquid flow path 84 and circulates. A pH adjuster and a pH meter can be provided in the liquid flow path 84.

In the pH adjuster, alkalis, such as potassium hydroxide, carbon dioxide, and the like can be used as pH adjusting agents. As carbon dioxide of a pH adjusting agent, carbon dioxide in a concentrated gas obtained by the first concentration unit 11 or the second concentration unit 13 can be used, for example.

In the electrochemical reaction device 2A, when a voltage is applied to the cathode 21 and the anode 22, carbon dioxide in concentrated gas G3 flowing through the gas flow path 24a is reduced, and a carbon compound and hydrogen are produced. In a case where the electrochemical reaction device 2A is used, the electrolyte B can be supplied as an anode-side electrolyte and the pH of the cathode-side electrolyte can be made higher than that of the anode-side electrolyte to further suppress the generation of hydrogen in the cathode 21 and further produce ethylene with high efficiency.

As specific pH's, the pH of the anode-side electrolyte can be set to 14 or less, for example, within a range of 8 to 14, and the pH of the cathode-side electrolyte can be set to be more than 14.

In addition, it is possible to appropriately replace constituent elements in the embodiment with well-known constituent elements within the scope not departing from the gist of the present disclosure, and the above-described modification example may be appropriately combined.

EXPLANATION OF REFERENCES

100 Carbon dioxide treatment device
1 Recovery device
2, 2A Electrochemical reaction device
3 Power source storage device
4A First concentration sensor
4B Second concentration sensor
5 Control device
6 Homologation reaction device
7 Heat exchanger
11 First concentration unit
12 Absorption unit
13 Second concentration unit
21 Cathode
22 Anode
23a Liquid flow path
24a Gas flow path
31 Conversion unit
32 Storage unit
33 Positive electrode
34 Negative electrode
35 Separator
36 Positive electrode side flow path
37 Negative electrode side flow path
61 Reactor
62 Gas-liquid separator

What is claimed is:

1. A carbon dioxide treatment device comprising:
a recovery device configured to recover carbon dioxide;
an electrochemical reaction device having a cathode and an anode and configured to electrochemically reduce the carbon dioxide recovered by the recovery device to produce ethylene;
a first concentration sensor configured to measure a concentration of ethylene in a gas obtained on the cathode side of the electrochemical reaction device; and
a control device configured to control an amount of carbon dioxide supplied to the electrochemical reaction device and a voltage applied to the cathode and the anode based on the concentration of ethylene measured by the first concentration sensor,
wherein the control by the control device includes (i) keeping the applied voltage constant and increasing or decreasing the carbon dioxide supply amount to control the carbon dioxide supply amount to be an amount at which the concentration of ethylene measured by the first concentration sensor becomes a maximum value, and
wherein the control by the control device includes (i) keeping the applied voltage constant and increasing or decreasing the carbon dioxide supply amount to control the carbon dioxide supply amount to be an amount at which the concentration of ethylene measured by the first concentration sensor becomes a maximum value and (ii) keeping the carbon dioxide supply amount constant and increasing or decreasing the applied voltage to control the applied voltage to be a voltage at which the concentration of ethylene measured by the first concentration sensor becomes a maximum value, and (i) and (ii) described above are repeated.

2. The carbon dioxide treatment device according to claim 1,
wherein the recovery device includes an absorption unit that brings carbon dioxide gas into contact with an electrolyte consisting of a strong alkaline aqueous solution to dissolve the carbon dioxide in the electrolyte and absorb the carbon dioxide,
wherein the electrochemical reaction device includes the cathode, the anode, and a liquid flow path which is provided between the cathode and the anode and through which the electrolyte in which the carbon dioxide is absorbed in the absorption unit flows,
wherein dissolved carbon dioxide in the electrolyte in which the carbon dioxide is absorbed is reduced at the cathode, and
wherein a supply amount of the electrolyte in which the carbon dioxide is absorbed to the electrochemical reaction device is controlled by the control device.

3. The carbon dioxide treatment device according to claim 1,
wherein the recovery device includes a concentration unit that concentrates carbon dioxide,
wherein the electrochemical reaction device includes the cathode, the anode, and a liquid flow path which is provided between the cathode and the anode and through which the electrolyte flows,
wherein the carbon dioxide gas which is supplied from the concentration unit to a side opposite to an anode side of the cathode in the electrochemical reaction device is reduced at the cathode, and
wherein the amount of the carbon dioxide gas supplied to the electrochemical reaction device is controlled by the control device.

4. The carbon dioxide treatment device according to claim 1,
wherein the electrochemical reaction device includes the cathode, the anode, an anion exchange membrane provided between the cathode and the anode, a cathode-side liquid flow path which is provided between the cathode and the anion exchange membrane and through which a cathode-side electrolyte flows, and an anode-side liquid flow path which is provided between the anode and the anion exchange membrane and through which an anode-side electrolyte flows,
wherein the recovery device includes an absorption unit that brings carbon dioxide gas into contact with the anode-side electrolyte consisting of a strong alkaline aqueous solution to dissolve the carbon dioxide in the anode-side electrolyte and absorb the carbon dioxide, and a concentration unit that concentrates carbon dioxide,
wherein the carbon dioxide gas which is supplied from the concentration unit to a side opposite to an anode side of the cathode in the electrochemical reaction device is reduced at the cathode, and
wherein the amount of the carbon dioxide gas supplied to the electrochemical reaction device is controlled by the control device.

5. The carbon dioxide treatment device according to claim 1, further comprising:
a second concentration sensor configured to measure a concentration of hydrogen in the gas obtained on the cathode side of the electrochemical reaction device,
wherein control by the control device is started when the concentration of hydrogen measured by the second concentration sensor becomes a predetermined value or more.

6. The carbon dioxide treatment device according to claim 1, further comprising:
a homologation reaction device configured to increase a number of carbon atoms by multimerizing ethylene produced by reducing carbon dioxide in the electrochemical reaction device.

7. A carbon dioxide treatment method comprising:
a step (a) of electrochemically reducing carbon dioxide at a cathode using an electrochemical reaction device including the cathode and an anode to produce ethylene;
a step (b) of keeping a voltage applied to the cathode and the anode constant and increasing or decreasing an amount of carbon dioxide supplied to the electrochemical reaction device to control the carbon dioxide supply amount to an amount at which a concentration of ethylene in a gas obtained on the cathode side of the electrochemical reaction device is maximized; and
a step (c) of keeping the amount of carbon dioxide supplied to the electrochemical reaction device constant and increasing or decreasing the voltage applied to the cathode and the anode to control the applied voltage to be a voltage at which the concentration of ethylene in the gas obtained on the cathode side of the electrochemical reaction device is maximized,
wherein the step (b) and the step (c) are repeated to control the carbon dioxide supply amount and the applied voltage.

8. A method for producing a carbon compound which utilizes the carbon dioxide treatment method according to claim 7, the method comprising:
a step (d) of multimerizing ethylene produced by reducing carbon dioxide to obtain a carbon compound.

* * * * *